United States Patent [19]

Kuckes

[11] Patent Number: 5,512,830
[45] Date of Patent: Apr. 30, 1996

[54] MEASUREMENT OF VECTOR COMPONENTS OF STATIC FIELD PERTURBATIONS FOR BOREHOLE LOCATION

[75] Inventor: Arthur F. Kuckes, Ithaca, N.Y.

[73] Assignee: Vector Magnetics, Inc., Ithaca, N.Y.

[21] Appl. No.: 149,841

[22] Filed: Nov. 9, 1993

[51] Int. Cl.$^6$ .............................. G01V 3/18; E21B 47/09
[52] U.S. Cl. .................................................................. 324/346
[58] Field of Search ...................................... 324/346, 326, 324/345; 175/45; 166/254, 255, 66.5; 364/422

[56] References Cited

U.S. PATENT DOCUMENTS

| | | |
|---|---|---|
| 2,436,039 | 2/1945 | Fay . |
| 2,664,542 | 12/1953 | Lynn . |
| 3,350,634 | 10/1967 | Hoehn, Jr. . |
| 3,406,766 | 10/1968 | Henderson . |
| 3,725,777 | 4/1973 | Robinson et al. . |
| 3,731,752 | 5/1973 | Schad . |
| 3,745,446 | 7/1973 | Norris . |
| 3,853,185 | 12/1974 | Dahl et al. . |
| 4,072,200 | 2/1978 | Morris et al. . |
| 4,293,815 | 10/1981 | West et al. . |
| 4,323,848 | 4/1982 | Kuckes . |
| 4,372,398 | 8/1983 | Kuckes . |
| 4,443,762 | 4/1984 | Kuckes . |
| 4,458,767 | 7/1984 | Hoehn, Jr. . |
| 4,465,140 | 8/1984 | Hoehn, Jr. . |
| 4,593,770 | 6/1986 | Hoehn, Jr. . |
| 4,700,142 | 10/1987 | Kuckes . |
| 4,710,708 | 12/1987 | Rorden et al. ........................ 324/326 |
| 4,791,373 | 12/1988 | Kuckes . |
| 4,933,640 | 6/1990 | Kuckes . |
| 5,064,006 | 11/1991 | Waters et al. . |
| 5,074,365 | 12/1991 | Kuckes . |
| 5,151,658 | 9/1992 | Muramatsu et al. ................... 166/254 |
| 5,218,301 | 6/1993 | Kuckes . |

FOREIGN PATENT DOCUMENTS 1269710  5/1990  Canada .
1445063  8/1976  United Kingdom .

OTHER PUBLICATIONS

Robinson et al., "Magnetostatic Methods for Estimating Distance and Direction from a Relief Well to a Cased Wellbor", Jun. 1972, Journal of Petroleum Technology, pp. 741–749.

Tarr et al., "Use of New Ranging Tool to Position a Vertical Well Adjacent to a Horizontal Well", SPE paper No. 20446, SPE Drilling Engineering, 1990, pp. 421–430.

West et al., "Successful ELREC Logging for Casing Proxmity in a Offshore Louisiana Blowout", SPE papter No. 11996, SPE Drilling Engineering, 1983, pp. 1–8.

Jones et al., SPE Paper No. 14388, SPE Drilling Engineering, Jun. 1987.

Primary Examiner—Sandra L. O'Shea
Assistant Examiner—Roger Phillips
Attorney, Agent, or Firm—Jones, Tullar & Cooper

[57] ABSTRACT

A method and apparatus for determining the distance and direction to a borehole containing ferromagnetic material includes placing a sensor package in a second nearby borehole and measuring three vector components of the static magnetic field perturbations of the earth's magnetic field caused by the ferromagnetic material. The sensor package is moved within the second borehole to obtain a plurality of magnetic field measurements, and the measured components are then projected onto a system of fixed coordinates whose orientation in space is known. The relative direction from the second borehole to the first is determined from the vector components, and the magnitude of the resultant in the direction of the first borehole is then determined from the fixed coordinate system.

In a modification, the sensor package includes two spaced magnetometers for measuring vector components of the magnetic field perturbations. The measured components are subtracted to obtain a difference value which represents the perturbations in the total magnetic field.

15 Claims, 2 Drawing Sheets

FIG. 2
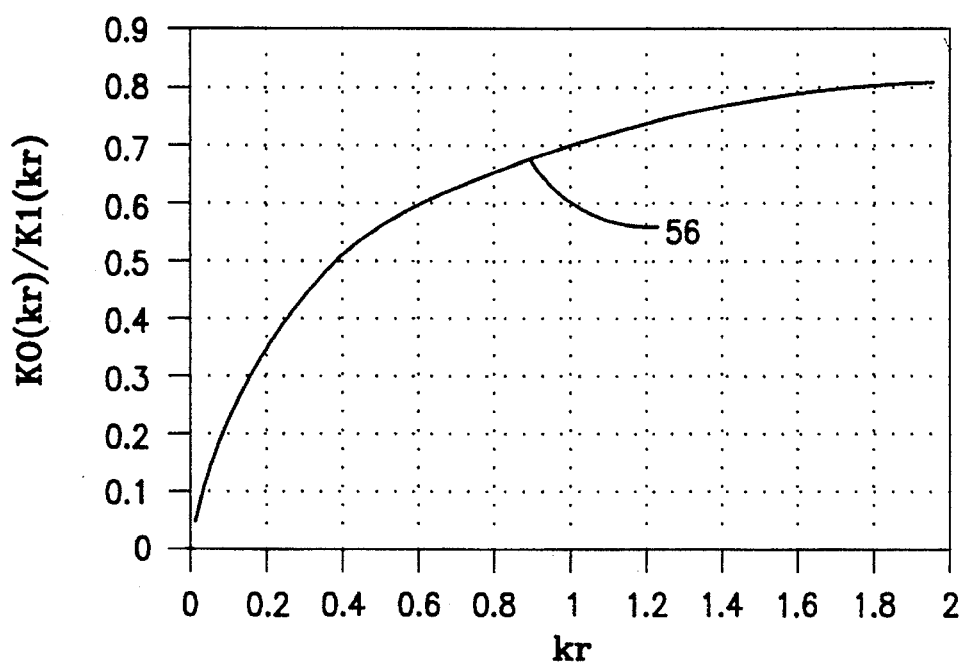
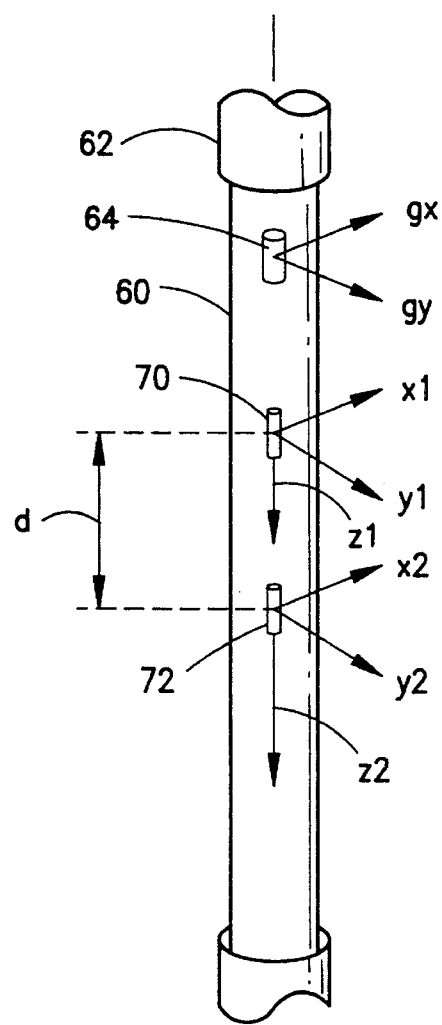
FIG. 4

MEASUREMENT OF VECTOR COMPONENTS OF STATIC FIELD PERTURBATIONS FOR BOREHOLE LOCATION

BACKGROUND OF THE INVENTION

The present invention relates, in general, to a well logging method using magnetic field sensors to locate subterranean well casings and drill strings in a target well from a nearby borehole, and more particularly to a method for determining the distance and the direction to a first borehole containing material with remanent magnetization from measurements of the static magnetic field in an adjacent second borehole.

The need for locating target wells containing casings or drill strings arises in various contexts, including the need to drill a borehole to intersect or to reenter the target well in question. For example, in the development of gas storage fields, reentry of old wells which cannot be reentered directly from the surface because of corroded casing or because sections of casing have been removed, is an important requirement, particularly for proper abandonment of such wells. Furthermore, the corrosion of poorly abandoned wells in general, and subsequent leakage of these wells into aquifers and to the surface, present problems of increasing environmental significance. Additionally, in the drilling of oil wells, blowouts occur from time to time, and this may require the drilling of a relief well to intersect the blowout target well in order to shut off dangerous high rates of flow, as in cases when surface control is not possible.

Several methods have been developed to measure and to analyze the static magnetic fields associated with ferromagnetic well casings and drill strings for the purpose of guiding the drilling of a new, or a "relief" borehole to either intersect or to follow a controlled path in the vicinity of a "target" well containing the ferromagnetic material. Robinson et al. U.S. Pat. No. 3,725,777, discloses the use of a "least squares" method, based on magnetostatic theory, to simultaneously fit a curve representing the total measured magnetic field magnitude, including both the earth's field and perturbations, as a function of depth, to a curve representing the difference in readings given by a magnetic compass and a gyrocompass for the direction to "north" also as a function of depth in the well being drilled. Canadian patent No. 1,269,710 to Barnett et al., discloses a method of Fourier analysis of either the axial or the lateral component of localized magnetic poles and dipoles on a well string for distance determination. This latter patent does not, however, address the problem of axially distributed poles; i.e., pole smearing, which is particularly important at close distances when passive magnetic methods of proximity determination are most important. The importance of these effects was evaluated quantitatively by Jones, Hoehn, and Kuckes in SPE paper 14388, SPE Drilling Engineering, 1987.

U.S. Pat. No. 3,745,446 issued to Norris discloses apparatus utilizing the difference in the horizontal field between vertically spaced magnetometers, together with a z-axis measurement to permit the top of a buried casing to be pinpointed. U.S. Pat. No. 4,072,200 issued to Morris et al. discloses a method of analyzing the field perturbations of a magnetic pole which utilizes the difference in the gradient of the axial field component observed at two points in the hole being drilled.

While the foregoing methods have enjoyed some success, in practice each has shown limitations. Furthermore, although active source methods have largely superseded passive methods based on the analysis of static field perturbations, the inherent simplicity of passive methods has appeal and, in addition, has potential importance when short ranges are to be evaluated. In particular, a need often still exists to determine lateral distance and direction between two wells unambiguously when they are in close proximity; i.e., at the critical point just before drilling contact is made between two well bores.

SUMMARY OF THE INVENTION

It is, therefore, an object of the present invention to provide a passive method of determining the distance and direction from a relief well to a target borehole utilizing measurements of magnetic field perturbations.

It is another object of the invention to provide apparatus for measuring remanent magnetism originating in a target borehole containing ferromagnetic material for use in determining the distance and direction of the target from a relief well.

In accordance with the present invention, a method is provided for determining the distance and the direction from a borehole containing a measuring instrument package to a target borehole containing material having remanent magnetization. The method includes measuring in the relief borehole and at each of a plurality of spaced positions, three orthogonal vector components of the magnetic field. The depth of each spaced position from a known reference point such as the earth's surface is measured, and the three components of the observed static field are recombined with respect to a fixed coordinate system through Fourier analysis of the components. The fixed coordinate system, which has a direction in space which is fixed at each of the measurement positions, may be based on the direction of the high side of an inclined relief well.

In general, the magnetic field surrounding a target well containing ferromagnetic material will have the characteristics of a field generated by a distribution of simple magnetic pole sources along the axis of the well. At any point in space, this source configuration produces an axial field component $b_z$ along the source axis and a radial field component $br$ in the radial direction from the source axis. An important point is that this source configuration does not produce any azimuthal field component.

Magnetostatic analysis defines modes whose source distribution varies sinusoidally along the well. Each mode has its own axial and radial modal field amplitudes which vary sinusoidally along a line at a radius r which is parallel to the source axis. Modal analysis defines the ratio of the sinusoidal amplitude of the axial and radial mode components to be a function of the ratio of the radius from the source axis at which the line is located and the wavelength ($\lambda$) of the sinusoidal variations. Defining the parameter $2\pi r/\lambda$ which is proportional the ratio of radius and wavelength, the ratio of the modal amplitudes defines a function $g(2\pi r/\lambda)$. Thus the ratio of the axial to radial modal amplitudes associated with a given wavelength $\lambda$ determines the numerical value g which defines the value of the parameter $2\pi r/\lambda$. Since $\lambda$ is known, r is readily found. In practice the ratio of the modal amplitudes gives a good determination of the radial distance r if r is less than a wavelength $\lambda$ characterizing the source distribution.

If the pole distribution is an arbitrary function of z along the length of the source well, then Fourier analysis of the z variation of the field components along the axis of the observation well can be used to decompose the field values there into a superposition of sinusoidally varying modes. The ratio of the modal amplitudes $B_z$ and Br of each mode which is characterized by its own wavelength can be found.

Since the field perturbation at any observation point has no azimuthal component, the part of the perturbation field lying in a plane perpendicular to the axial direction will have only a radial component which will be directed either to or away from the source axis. Modal analysis of the fields couples the variations of the radial and axial field components. The physical requirement that the strength of the perturbation fields must decrease with increasing radius leads to the fact that if the axial component varies as cos $(2\pi z/\lambda)$ then the radial component must vary as—sin $(2\pi z/\lambda)$ and not as +sin $(2\pi z/\lambda)$. Thus by noting the phase relationship of the Fourier amplitude of the radial and the axial field components it is possible to identify the direction of increasing radius from the source.

The foregoing process is carried out by making a set of measurements spaced along the length of the observation well. These measurements are made by moving the field sensor along the axis of a relief borehole, with the measurements being sufficiently close together to delineate variations in the lateral field $B_r$ with depth; the more measurements, the better the results.

Since the field perturbations due to the ferromagnetic material may be very small compared to the earth's magnetic field, it is important to separate the two, in order to measure the perturbation field accurately. This may be difficult to do with a single magnetic field sensor, so in another embodiment of the invention a pair of sensors, separated by a distance d, is used for each measurement. This provides a gradient magnetometer, which permits cancellation of the earth's field component from the field measurements. The same Fourier analysis of the field perturbations can then be made, free of the earth's field, thereby providing improved resolution and range.

In accordance with the invention, then, the distance and direction to a target well containing ferromagnetic material exhibiting a remanent magnetic field can be determined through the use of a measuring instrument including one or more magnetometers and an inclinometer. This instrument can be incorporated in a drill string for measurement while drilling (MWD) or can be a separate instrument package supported by a wire line in the relief well. In either case, accurate and reliable determinations of distance and direction from the relief well to the target well can be obtained.

BRIEF DESCRIPTION OF THE DRAWINGS

The foregoing and additional objects, features, and advantages of the present invention will be apparent to those of skill in the art from the following detailed description of a preferred embodiment thereof, taken in conjunction with the accompanied drawings, in which:

FIG. 2 is a plot of the function, i.e., the ratio of Fourier amplitudes of the axial and radial modal amplitudes obtained from measured magnetic field as a function of the parameter $2\pi r/\lambda = kr$;

FIG. 4 is an enlarged view of a modified instrument package for use in the relief well.

DESCRIPTION OF PREFERRED EMBODIMENT

Figure 1:
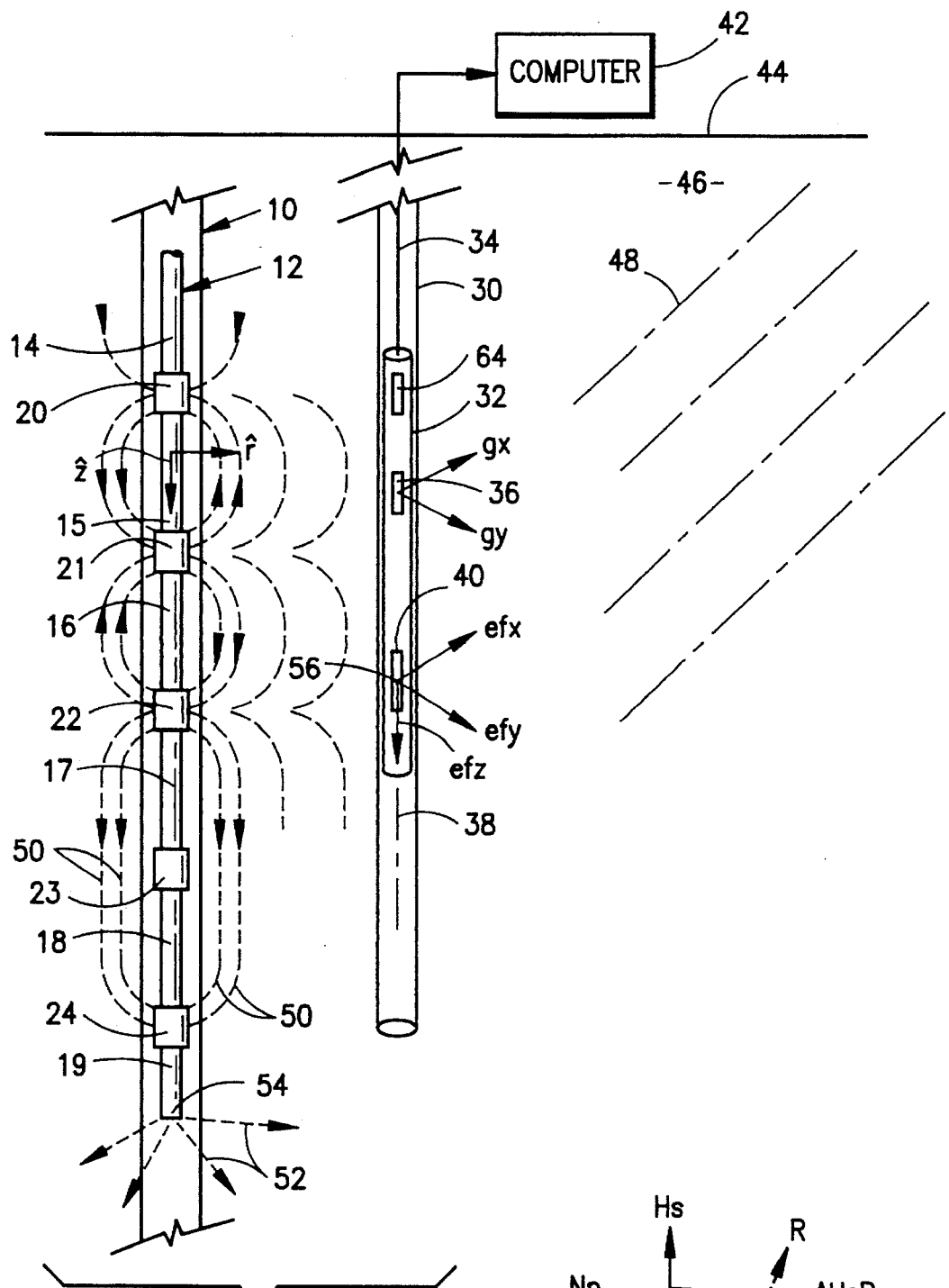
FIG. 1 is a diagrammatic view of a target well illustrating remanent magnetism and a nearby relief well containing a measuring instrument for practicing the method of the present invention.

Turning now to a more detailed consideration of the present invention, there is illustrated in FIG. 1 in diagrammatic form a target well 10 which may be, for example, an abandoned gas well, a blown-out oil well, or the like which contains a string 12 of pipe sections 14–19 connected end to end at joints 20–24. These pipe sections may make up a drill string, a well casing, or the like having multiple sections of ferromagnetic material, or may be other ferromagnetic material in the well.

Near the well 10 is a relief well, or borehole, 30 which is being drilled in the earth adjacent target well 10 for the purpose of, for example, intersecting the target well at a selected depth or, in the alternative, for the purpose of passing close by the target well without intersecting it. In either case, it is particularly important to determine the lateral distance and direction between the two wells unambiguously when they are in close proximity, for example, at a point when they are only one to ten feet apart, shortly before drilling contact is made between the relief and target well. In order to measure this distance and direction, a measuring instrument package 32 is provided in borehole 30. In the illustrated embodiment of FIG. 1, the measuring instrument is supported in the borehole by a wireline 34 so that the instrument may be raised and lowered and positioned in desired locations for the measurement of various parameters, as will be described. Alternatively, the measuring instrument 32 can be incorporated in a drill string for measurement while drilling (MWD) operation. Instrument 32 preferably incorporates an inclinometer 36 for measuring the deviation from vertical of the axis 38 of the instrument, and thus of the deviation from vertical of the axis of the borehole at the instrument location, and includes a magnetometer 40 for measuring the vector components of the total magnetic field within the earth at the location of the measuring instrument. The instrument package 32 is connected as by cables or by a conventional pressure pulse transmission system to a computer 42 at the surface 44 of the earth 46.

In addition to the earth's magnetic field 48, the dominant static magnetic field associated with a well casing or drill string such as that illustrated at 12 is that due to the remanent ferromagnetism in each of the lengths of pipe. These pipes are usually 9–12 meters long and are connected end to end to make up the overall well casing or drill string. The static field due to remanent ferromagnetism, which is diagrammatically illustrated by the dotted lines 50, produces perturbations in the earth's magnetic field. These perturbations can be represented by distributed magnetic pole sources along the length of the pipe string 12 with concentrations near some of the pipe joints 20–24. The static field is generated by remanent magnetism originating from a variety of causes, the dominant ones being associated with the mechanical fabrication of the pipe itself, and with magnetic inspection procedures for detecting defects in the pipe material.

In addition, a magnetic field 52 is produced near the end 54 of the pipe string. This field can also be represented as a distributed strong pole, its strength being directly related to the flux of the earth's magnetic field trapped in the casing or drill string by reason of the high magnetic permeability of the material used to fabricate the pipe sections. Thus, field perturbations generated by a casing or drill string in a well often have a generally periodic nature along the length of the string, or can be represented by plurality of point sources which are periodic, the field being generated by poles of varying strengths located along the axis of the pipe string. Whether periodic or not, the fields can be represented by a superposition of sinusoidally varying modes.

A determination of the distance and direction to the target well 10 from an observation point 56 in the relief borehole 30 begins with a consideration of the classical modal Fourier analysis of magnetic fields. The lateral and axial components $b_r$ and $b_z$, respectively, can be analyzed to provide Fourier amplitudes $B_r(k)$ and $B_z(k)$, as follows:

$$B_r(k) = \int_{-\infty}^{+\infty} b_r(z) e^{ikz} dz \quad \text{(Eq. 1)}$$

$$B_z(k) = \int_{-\infty}^{+\infty} b_z(z) e^{ikz} dz \quad \text{(Eq. 2)}$$

A form of the relevant potential theory is reviewed in appendix B of an article entitled "Magnenostatic Methods for Estimating Distance and Direction From a Relief Well to a Cased Wellbore", Robinson et al., *Journal of Petroleum Technology*, June 1972, pp. 741–749, where the magnetic field exterior to an infinitely long hollow cylinder with periodic remanent magnetization is analyzed. The magnetization on the cylinder is periodic along its z-axis, and under these conditions the magnetic field exterior to the cylinder can be derived. This theoretical consideration indicates that the ratio of the Fourier amplitudes $B_r(k)$ and $B_z(k)$ at the observation point for each wave number k ($2\pi/\lambda$) obey the relationship:

$$\frac{B_z(k)}{B_r(k)} = \frac{(-i) K_0(kr)}{K_1(kr)} = -ig(kr) = -ig(2\pi/\lambda) \quad \text{(Eq. 3)}$$

where $K_0(kr)$ and $K_1(kr)$ are Bessel functions, where $i=\sqrt{-1}$, and where r is the radial coordinate of the observation point from the axis of the magnetic poles. This ratio of the axial and radial Fourier amplitudes is plotted in FIG. 2, and is a function of the parameter kr; i.e., it is a function of the product of k and the radial distance r separating the target well from the observation point. Thus, by noting the ratio of the Fourier amplitudes given by Equation 3 for a given value of k, the product kr is uniquely determined. From this, the radial distance r separating the observation point from the axis of the magnetic poles can be found. Alternatively, an ensemble of Fourier amplitude ratios for different k values can be obtained and the ratios fitted to the universal function of kr illustrated in FIG. 2, by using a least squares method of analysis to obtain an optimized determination of the separation r between the axis of the magnetic poles and the observation point.

The foregoing mathematical principles apply also to measurements of the differences between the magnetic fields at sites separated by distance d along the z-axis. In this case, the Fourier amplitudes $Bd_r(k)$ and $Bd_z(k)$ of the field differences can be computed as follows:

$$Bd_r(k) = \int_{-\infty}^{+\infty} [b_r(z+d) - b_r(z)] e^{ikz} dz \quad \text{(Eq. 4)}$$

$$Bd_z(k) = \int_{-\infty}^{+\infty} [b_z(z+d) - b_z(z)] e^{ikz} dz \quad \text{(Eq. 5)}$$

Mathematical manipulation of equations 4 and 5 illustrates that the ratio set out in equation 3 remains invariant for these field difference amplitudes, as follows:

$$\frac{Bd_z(k)}{Bd_r(k)} = \frac{(e^{-ikd}-1) B_z(k)}{(e^{-ikd}-1) B_r(k)} = \frac{(-i) K_0(kr)}{K_1(kr)} \quad \text{(Eq. 6)}$$

The foregoing theoretical principles, when applied to the location of the target well from multiple magnetic field measurements in a nearby, approximately parallel borehole, raise several considerations. First, it is usually necessary to limit the depth interval over which the radial distance r is to be determined when drilling a relief borehole. However, the Fourier integrals in equations 1, 2, 4, and 5 specify that the data are to be analyzed along the z-axis from $-\infty$ to $+\infty$. In order to meet the requirements of the present invention, therefore, the analysis is done using a Fourier windowing technique which limits the depth interval z contributing to the measurements, thereby restricting the k values which are evaluated.

A second consideration is that the relations defined in equations 1, 2, 4, and 5 call for Fourier analysis of the components of the observed magnetic field in the $\hat{r}$ and the $\hat{z}$ directions. It is relatively easy to make measurements of the magnetic field components in the z direction to obtain the value $b_z(z)$, but not $b_r(z)$. However, two perpendicular components of the field $b_x(z)$ and $b_y(z)$ can be measured in x and y directions in a plane perpendicular to the z direction. The $\hat{r}$ direction in the x-y plane is, however, unknown and $\hat{r}$, the unit vector pointing away from the source axis toward the observation point, is one of the quantities to be determined.

A third consideration in applying the foregoing theoretical principles is the fact that a measuring instrument package used to sense the magnetic field in a borehole is often hung on a cable so that the instrument package is free to rotate. As a result, at each depth of measurement the rotational orientation of the x and y directions in the plane perpendicular to the z axis of the package is unknown, the directions varying at random as the instrument rotates on the cable as it is raised or lowered.

Because of the foregoing difficulties, the radial component $B_r(k)$ cannot be directly obtained through computation of the Fourier transform of equation 1. The linear nature of Fourier transforms leads to the conclusion that the transform amplitude $B_r(k)$ obeys the same rules of vector decomposition into orthogonal components in the plane perpendicular to the z axis, as does the magnetic field vector component $b_r(z)$. It is possible, in accordance with the invention, to measure vector x and y components of the magnetic field in order to obtain the value of the radial Fourier amplitude $B_r(k)$. To do so, the measured x and y values of the apparent earth's magnetic field are projected onto the axes of a coordinate system which is rotationally fixed in space throughout the depth interval of investigation and Fourier amplitude components are found with respect to these fixed axes. The ratio of these Fourier components defines the direction of r, although it does not define its sense. The two components of the Fourier amplitude found, with respect to this rotationally fixed system, are then projected onto the direction of r, and then added to determine the value $B_r(k)$, with an ambiguity of sign (+ or −). To determine this sign, and thus the sense of r, the relative phase of the amplitudes of $B_r(k)$ and $B_z(k)$ is obtained from the potential theory relation set out in equation 3.

Computation of the Fourier amplitude $B_z(k)$ is straightforward, since the quantity $b_z(z)$ can be measured directly by a magnetometer; for example, a fluxgate, whose axis is aligned with the z-axis of the instrument package.

For the case where the target well 10 and the relief well 30 are approximately straight and generally are parallel to each other, the z component of the earth's field Fourier amplitude Efz(k) corresponding to the general theory Fourier transform amplitude $B_z(k)$ given above, can be readily computed. This is done from a set of measurements of the z component of the earth's field efz(z) from a magnetometer, whose axis of sensitivity is aligned with a borehole axis, by the following equation:

$$Efz(k) = \int_{-\infty}^{+\infty} efz(z)h(z) e^{ikz} dz \qquad (Eq. 7)$$

In equation 7, h(z) is a windowing function such as given by Hanning; i. e.:

$$h(z) = \int \begin{matrix} 0 & z < -w/2 \\ (1 + \cos(2\pi z/w))/2 & -w/2 < z < w/2 \\ 0 & z > w/2 \end{matrix} \qquad (Eq. 8)$$

This makes it possible to make localized evaluations of the Fourier amplitudes. To achieve this localization certain well known errors can enter which are discussed in reference books on the subject (e.g., p.467–472; Numerical Recipes in Pascal; Press, Flannery, Teukolsky and Vetterling; Cambridge Univ. Press, 1989). Windowing in this way optimally localizes the depth interval over which data are used in the determination of Fourier amplitudes so that is not necessary to make measurements along the entire length of the target well. In general, the characteristic width w of the window used should, if possible, b several times the value of 1/k where k is the longest wavelength of interest in the analysis.

To evaluate the Fourier amplitude defined by equation 7 as well as the other Fourier amplitudes which require evaluation, it is important that the measurements being analyzed are closely enough spaced in the direction of the z-axis to insure that the Nyquist criteria are met; i.e., that the spacing between measurements is such that there are at least two measurements per wavelength ($2\pi/k$) for which there is significant amplitude in the power spectrum of the magnetic field perturbations.

Figure 3:
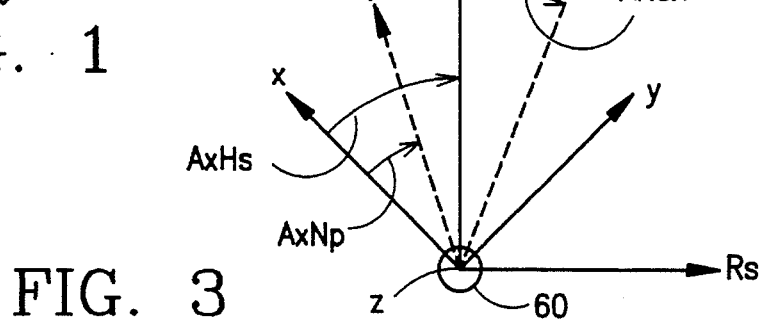
FIG. 3 is a diagrammatic illustration of magnetic field components at an observation point in the relief well in top plan view.

There are several ways in which the rotationally fixed coordinate system required for the method outlined above can be defined for a set of measurements. In a measurement while drilling (MWD) system, for example, such as that illustrated in FIG. 4, an instrument package 60 containing magnetic field sensors is connected in a rigid drill string 62 to allow the instrument package to be raised and lowered within the relief borehole 30 without rotation. In this case, the fixed coordinate system may be the x, y, and z directions defined by the orthogonal magnetometer axes themselves. In the embodiment of FIG. 1, where the instrument package 32 is suspended by a wireline, or cable, and thus can rotate about its vertical axis as it is raised and lowered, it is possible to deploy a gyro compass 64 (FIG. 1) in the instrument package. Such a gyro may be used to define the projection of true north (Np in FIG. 3) onto the x-y plane of the instrument, which is perpendicular to its axis, as the basis for a rotationally constant coordinate system. Determination of the angle AxNp between the x axis of the sensors and Np is well known by those of skill in the art. This x-y plane is illustrated in FIG. 3, which is a top plan view of the instrument 60, with the z axis pointing downhole along the borehole axis.

Often the simplest, and preferred, method of obtaining a fixed coordinate system is to provide two inclinometers as part of the instrument package, as illustrated at 36 in FIG. 1, to determine the x and y components gx and gy of gravity in the instrument package. This, in turn, permits the direction, in the x-y plane, of the high side of the instrument package and thus the high side of the borehole being drilled, to be easily determined. The direction of the high side is illustrated in FIG. 3 at Hs. The absolute direction of Hs in space can be determined from the inclinometer measurements and from independent measurements of the borehole slope and direction obtained from a gyroscopic survey of the borehole.

Drillers usually establish drilling direction changes by orienting the drilling tool face with respect to the high side, or Hs direction. Accordingly, determination of target direction with respect to the Hs direction often will be all that is required operationally to drill a borehole with a specified relationship to the target well. Accordingly, the following description of the method of the present invention is restricted to a determination of target well location with respect to the Hs direction in the relief well being drilled. If another direction is selected for the reference direction, the method is easily adaptable to that.

The use of the high side direction as the reference in a borehole requires that the borehole have a slope, or inclination. Even one degree of inclination away from the vertical is, in practice, usually enough to make a sufficiently precise determination of tool orientation with respect to the direction Hs. This orientation can be obtained by noting the outputs of two directional inclinometers, or accelerometers, to determine the two perpendicular components of gravity gx and gy in a plane perpendicular to the axis of the borehole, as indicated in Cit 36 in FIG. 1. Preferably, the inclinometers lie on the x and y axes illustrated in FIG. 3, with the angle A between the x axis and the Hs direction being denoted as angle AxHs. This angle is given by AxHs=atan2(−gy,−gx), where atan2 denotes the four quadrant inverse tangent function.

The field magnetometer 40 in the instrument 32 generates voltages which represent the earth's magnetic field components efx(z) and efy(z) in the x and y directions at the selected depth z. The direction Hs refers to the hole high side direction in the plane perpendicular to the borehole axis, which has been determined by the inclinometers 36 in the manner described above. To resolve the field measurements at any depth z to the high side (Hs) and the right side (Rs) directions, where the Rs direction is at 90° from the Hs direction in the x–y plane, the following equations are used:

$$efHs(z) = efx(z) \cos (AxHS) + efy(z) \sin (AxHS) \qquad (Eq\ 9)$$

$$efRs(z) = -efx(z) \sin (AxHS) + efy(z) \cos (AxHS) \qquad (Eq.\ 10)$$

The foregoing equations give a set of field determinations at different depths z which are then used to compute the k space Fourier amplitudes EfHs(k) and EfRs(k), for example by fast Fourier transform digital computations, in accordance with the following:

$$EfHs(k) = \int_{-\infty}^{+\infty} efHs(z)h(z) e^{ikz} dz \qquad (Eq.\ 11)$$

$$EfRs(k) = \int_{-\infty}^{+\infty} efRs(z)h(z) e^{ikz} dz \qquad (Eq.\ 12)$$

It is noted that h(z) in the foregoing equations is the same windowing function as was used in equation 7.

To determine the direction of r to the target, a wave number $k_0$ is selected for which the Fourier amplitudes determined by equations 11 and 12 are significant. A trial evaluation of the angle between the direction Hs and the direction r̂ pointing radially away from the source axis, indicated by R in FIG. 3, is done by computing a trial quantity AHsR' from the following equation:

$$AHsR'=atan2(EfRs(k_0),EfHS(k_0)) \qquad (Eq.\ 13)$$

AHsR' defines the following trial value Fourier amplitude:

$$Efr(k_0)'=EfHS(k_0)\cos(AHsR')+EfRs(k_0)\sin(AHsR') \qquad (Eq.\ 14)$$

The ratio of the Fourier amplitudes $(iEfz(k))/(Efr(k)')$ from the results of equations 7 and 14 should be positive if the trial quantity AHsR' determined by equation 13 is correct. If the ratio is negative, the trial direction for $\hat{r}$ is pointed toward the source rather than away. In this case, the correct value for aHsR (in degrees) is given by:

$$AHsR=AHsR'+b\ 180 \qquad (Eq.\ 15)$$

This trial evaluation then leads to the correct direction to the target well, and the angle AHsR provides the relationship between the direction of the high side direction Hs and the direction $\hat{r}$.

The correct value for the Fourier amplitude of the field perturbation and the radial direction Efr(k) is then found by inserting the correct angle AHsR into equation 14. The distance r between the wells is then computed from the following:

$$Re\left(\frac{i\,Efz(k)}{Efr(k)}\right)=\frac{K_0(kr)}{K_1(kr)} \qquad (Eq.\ 16)$$

where Re denotes the real part of the expression in parentheses. The imaginary part of this quantity is due to errors of measurement and can be ignored.

It is important to be able to measure the minutest perturbations of the earth's field; however, the earth's field is often so large in relationship to the target perturbations of interest that it is extremely useful to use a gradiometer configuration of the sensor for these measurements. Such a configuration is illustrated in FIG. 4, wherein a pair of magnetometers, preferably fluxgate magnetometers, 70 and 72 are mounted within the instrument package 60. As illustrated in FIG. 4, package 60 is mounted in a drill string 62, but if desired it can be suspended by a suitable wire line in the manner illustrated in FIG. 1. The two magnetometers 70 and 72 are separated by a known distance d so that the earth field sensors x1, y1, and z1 in magnetometer 70 measure the earth's field components in the x, y, and z directions at a depth z and earth field sensors x2, y2, and z2 in magnetometer 72 measure the x, y, and z components of the earth's field at a depth z+d. The earth's field components at location z may be labeled efx1, efy1, and efz1, while the earth's field components at depth z+d may be labeled efx2, efy2, and efz2. Because the static magnetic field in the earth, without the target well present, is very uniform, the difference signals obtained by subtracting the x, y, and z components of the earth's field at one depth from those obtained at the other depth are insensitive to the earth's natural magnetic field, but instead are totally generated by the perturbation field of the nearby target well. These difference signals are obtained as follows:

$$efdx=(efx2-efx1)$$

$$efdy=(efy2-efy1)$$

$$efdz=(efz2-efz1) \qquad (eq.\ 17)$$

The identical analysis can be applied to the foregoing difference signals as were applied to the magnetic field signals obtained from the single magnetometer 56 as described above with respect to equations 7–16. For the case of difference signals, the computation of the z component of the Fourier transform amplitude Efdz(k), which corresponds to the Fourier transform amplitude $B_z(k)$ set out in the general theory as expressed in equation 2, is readily computed from the windowed data measurements efdz(z) obtained by the pair of magnetometers 70 and 72. It is noted that the axes of sensitivity of these magnetometers are aligned with the borehole axis. The Fourier transform amplitude is computed in accordance with the following equation:

$$Efdz(k)=\int_{-\infty}^{+\infty}efdz(z)h(z)\,e^{ikz}\,dz \qquad (Eq.\ 18)$$

The components of the difference signals with respect to the high side direction (efdHs(z)) and with respect to the right side direction (efdRs(z)) are found from the following:

$$efdHs(z)=efdx(z)\cos(AxHs)+efdy(z)\sin(AxHs) \qquad (Eq.\ 19)$$

$$efdRs(z)=-efdx(z)\sin(AxHs)+efdy(z)\cos(AxHs) \qquad (Eq.\ 20)$$

The Fourier transforms of these components are then taken, after windowing, as follows:

$$EfdHs(k)=\int_{-\infty}^{+\infty}efdHs(z)h(z)\,e^{ikz}\,dz \qquad (Eq.\ 21)$$

$$EfdRs(k)=\int_{-\infty}^{+\infty}efdRs(z)h(z)\,e^{ikz}\,dz \qquad (Eq.\ 22)$$

To determine the direction of r, whose positive sense points away from the target well, a wave number $k_0$ is selected for which the Fourier amplitudes obtained from equations 18, 21, and 22 are significant. A trial evaluation of the angle from Hs to R; i.e., AdHsR', for these difference measurements is obtained as follows:

$$AdHsR'=atan2(EfdRs(k_0),EfdHs(k_0)) \qquad (Eq.\ 23)$$

where AdHsR' defines a trial value Fourier amplitude in the radial direction Efdr $(k_0)$'.

$$Efdr(k_0)'=EfdHs(K_0)\cos(AHsR')+EfdRs(k_0)\sin(AHsR') \qquad (Eq.\ 24)$$

The ratio of the trial Fourier amplitudes $(iEfdz(k_0)/Efdr(k_0))$ computed from equations 18 and 24 should be positive.

If the ratio is negative, the correct AdHsR (in degrees) is given by:

$$AdHsR=AdHsR'+180 \qquad (Eq.\ 25)$$

The corrected value for the Fourier amplitude of the field perturbation in the radial direction Efdr(k) is then found by inserting the correct angle AdHsR into equation 24. As before, the distance between the wells is then computed from:

$$Re\left(\frac{i\,Efdz(k)}{Efdr(k)}\right)=\frac{K_0(kr)}{K_1(kr)} \qquad (Eq.\ 26)$$

with Re denoting the real part of the expression in parentheses. As before, the imaginary part of the quantity in parentheses is totally due to errors of measurement.

The ratio of the Fourier amplitudes set out in equation 26 for a given value of k uniquely determines the product kr from which the value of the separation r between the wells can be read from the graph of FIG. 2, since k is known. Alternatively, an ensemble of these Fourier amplitude ratios for different k values can be fitted to the universal function of kr shown in FIG. 2 by using a least squares method of analysis.

Although the invention has been described in terms of preferred embodiments, it will be understood that modifications can be made without departing from the true spirit and scope thereof as defined in the following claims.

What is claimed is:

1. A method for determining distance and direction to a borehole containing ferromagnetic material producing a static magnetic field perturbation in the earth's magnetic field, comprising:

providing a downhole measuring instrument having a single magnetometer for measuring three vector components of a magnetic field;

moving said measuring instrument along a first borehole to a plurality of spaced measurement locations, each at a different depth within the first borehole;

measuring, at each of said plurality of spaced locations, three vector components of total static magnetic field strength due to the earth's magnetic field and to static magnetic field perturbations produced by ferromagnetic material in a second borehole;

measuring the depth of each of said spaced locations within said first borehole from a known reference point;

determining an orientation in space of a high side of said first borehole to establish in said first borehole a fixed system of coordinates having axes rotationally fixed in space for all of said measurement locations;

determining from said measured vector components three corresponding fixed coordinate vector components of said total static magnetic field strength established with respect to said fixed system of coordinates;

determining from said fixed coordinate vector components a relative direction from said first borehole to said second borehole; and determining from said fixed coordinate vector components a magnetic field vector component magnitude in said direction to said second borehole to thereby determine the distance between said first and second boreholes.

2. The method of claim 1, wherein measuring said total static magnetic field at spaced locations includes characterizing said field as a superposition of plural static magnetic modes from distributed sources in said second borehole.

3. The method of claim 1, further including obtaining Fourier component values representing said total static magnetic field vector components and determining from said Fourier component values said three corresponding fixed coordinate vector components.

4. The method of claim 1, wherein measuring said total static magnetic field at each of said plurality of spaced locations includes Fourier analysis of said measured vector components to obtain Fourier component values representing the magnetic field produced by a superposition of sinusoidal modes from distributed magnetic poles along the axis of said second borehole.

5. The method of claim 4, wherein obtaining Fourier component values includes representing magnetic fields with modes characterized by a wavelength $\lambda$, and wherein measuring said total static magnetic field includes measuring vector components of said total static magnetic field at locations separated by a distance r which is less than said wavelength $\lambda$.

6. The method of claim 5, wherein measuring vector components at each of a plurality of locations includes measuring said vector components at locations sufficiently close together to delineate variations in said magnetic field with depth.

7. A method for determining distance and direction to a nearby borehole containing ferromagnetic material producing a static magnetic field perturbation in the earth's magnetic field, comprising:

measuring, at each of a plurality of spaced locations each at a different depth within a first borehole, three vector components of total magnetic field strength due to the earth's magnetic field and to static magnetic field perturbations produced by superposed sinusoidal modes from distributed magnetic poles in ferromagnetic material along a second borehole;

obtaining Fourier component values representing said total magnetic field through Fourier analyses of said measured vector components;

measuring the depth of each of said locations within said first borehole from a known reference point;

determining from said Fourier component values three fixed coordinate vector components of said total magnetic field strength, with respect to a system of coordinates whose orientation in space is fixed and is known, at each of said spaced locations;

determining from said fixed coordinate vector components a relative direction from said first borehole to said second borehole; and determining from said fixed coordinate vector components a magnetic field vector component magnitude in said direction to said second borehole to thereby determine the distance between said first and second boreholes.

8. The method of claim 7, wherein obtaining Fourier component values includes representing magnetic fields with modes characterized by a wavelength $\lambda$, and wherein measuring said total static magnetic field includes measuring vector components of said total static magnetic field at locations separated by a distance r which is less than said wavelength $\lambda$.

9. The method of claim 8, wherein measuring vector components of the total static magnetic field at each of a plurality of locations includes measuring said vector components at locations sufficiently close together to delineate variations in said magnetic field with depth.

10. The method of claim 8, wherein measuring the total magnetic field at each location includes measuring a total magnetic field gradient.

11. The method of claim 10, wherein measuring said total magnetic field gradient includes measuring said total static magnetic field simultaneously at two locations spaced apart by a distance d and subtracting said simultaneous measurements to determine magnetic field perturbations due to remanent magnetism.

12. The method of claim 11, further including measuring the inclination of said first borehole, and orienting said fixed coordinate system to the measured inclination.

13. A method for determining distance and direction to a borehole containing ferromagnetic material producing a static magnetic field perturbation in the earth's magnetic field, comprising:

providing a downhole measuring instrument having a single magnetometer for measuring three vector components of a magnetic field;

moving said measuring instrument along a first borehole to a plurality of spaced measurement locations, each at a different depth within the first borehole;

measuring, at each of said plurality of spaced locations, three vector components of total static magnetic field strength due to the earth's magnetic field and to static magnetic field perturbations produced by ferromagnetic material in a second borehole;

measuring the depth of each of said spaced locations within said first borehole from a known reference point;

measuring the inclination of said first borehole;

establishing a fixed system of coordinates in said first borehole in accordance with said measured inclination to provide coordinates having axes rotationally fixed in space for all of said measurement locations;

determining from said measured vector components three corresponding fixed coordinate vector components of said total static magnetic field strength established with respect to said fixed system of coordinates;

determining from said fixed coordinate vector components a relative direction from said first borehole to said second borehole; and determining from said fixed coordinate vector components a magnetic field vector component magnitude in said direction to said second borehole to thereby determine the distance between said first and second boreholes.

14. The method of claim 13, wherein measuring three vector components of the total static magnetic field at each of a plurality of locations includes measuring said components at locations sufficiently close together to delineate variations in the magnetic field with depth.

15. The method of claim 13, wherein measuring three vector components of the total static magnetic field at each location includes simultaneously measuring the total magnetic field at two locations spaced by a distance d and subtracting the simultaneous measurements to obtain a gradient value at each spaced location, said gradient value being used in determining said relative direction to said second borehole and the distance between said first and second boreholes.

* * * * *